W. B. FISHER.
Method and Apparatus for Treating Seeds.
No. 8,615. Reissued Mar. 11, 1879.
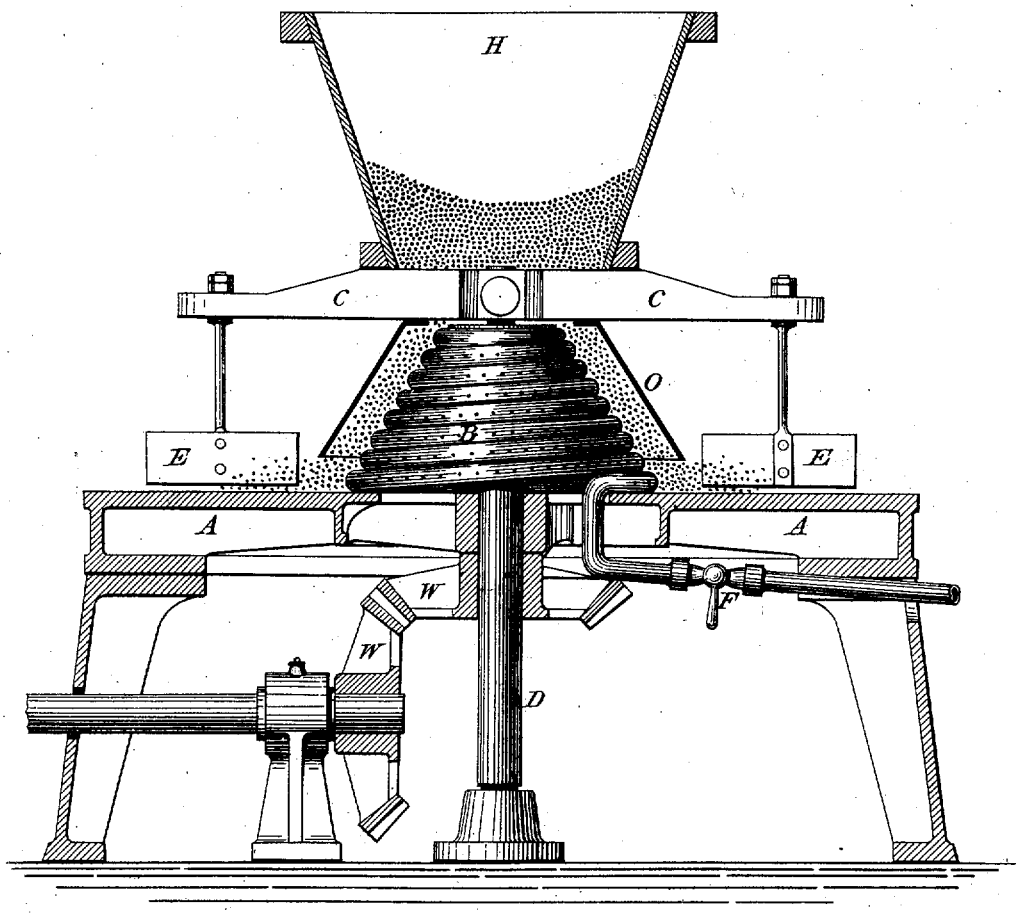
Attest:
D. G. Stuart
Wm Beale Hale.
Inventor:
Wm B. Fisher
by
Wm H Babcock
Attorney.
N. PETERS, PHOTO-LITHOGRAPHER, WASHINGTON, D. C.

UNITED STATES PATENT OFFICE

WILLIAM B. FISHER, OF NEWARK, NEW JERSEY.

IMPROVEMENT IN METHODS AND APPARATUS FOR TREATING SEEDS.

Specification forming part of Letters Patent No. 129,018, dated July 16, 1872; Reissue No. 8,615, dated March 11, 1879; application filed February 19, 1878.

*To all whom it may concern:*

Be it known that I, WILLIAM B. FISHER, of the city of Newark, Essex county, in the State of New Jersey, have invented a new and useful Process and Mechanism for Preparing Seeds for Storing and for the Operation of Pressing; and I do hereby declare that the following specification, taken in connection with the drawings forming a part thereof, is a full, clear, and exact description of my said process and mechanism, such as will enable others skilled in the art to practice the same.

My invention consists, in part, in subjecting oleaginous seeds and nuts to the direct action of steam directed and applied within or about the center of the mass of said seed, the motion of the latter being checked or regulated at will by suitable means.

My invention further consists of the mechanism preferably employed in the process, comprising a seed-receptacle, a steam-reservoir adapted to eject steam or moisture within or near the center of the moving seed, a table, and stirrers, said table being arranged to sustain the weight of the mass of seed and check their downward motion, and said stirrers being arranged to regulate the rapidity of such motion by removing the accumulated seed more or less speedily or completely. Said mechanism is more fully described hereinafter.

To enable others to practice my invention, I will describe it more in detail.

A bed for supporting the devices which form my improved apparatus is represented at A in the drawings, which table is provided with legs, also represented. Upon said table is a receptacle adapted to receive and retain the seed to be treated. The flow of the seed may be controlled at the will of the operator, the manner of effecting which will be explained hereinafter.

At or near the center of the mass of seed to be or in the position to be treated, or to be subjected to the action of the steam-jets or moisture, is located a steam pipe or receiver, (represented at B in the drawings,) which is provided with small holes, from which steam or moisture is forced outwardly in such a manner as to more thoroughly, uniformly, and effectually permeate the moving mass of seed than has been accomplished heretofore by other means.

Devices serving as stirrers or scrapers, or both, are represented at E in the drawings, which stirrers are adapted to rotate horizontally and act in conjunction with the seed-receptacle in such a manner as to stir, mix, and keep in motion said seed while being fed through the machine for treatment. Said stirrers are adapted to be adjusted at a greater or less inclination to the seed-receptacle to clear the seed undergoing treatment from the table or seed-receptacle more or less rapidly, as may be found desirable, which adjustment is accomplished by means of a screw-nut or screw-nuts. (Represented in the drawings.) A vertically-arranged revolving shaft, D, imparts motion to the stirrers. Steam or moisture is conveyed from the generator to the reservoir by any suitable means.

The lower part of the seed-receptacle, (represented at O,) adapted for partially confining the seed and steam when the softening and moistening process is required for pressing or other purposes, may be removed and a perforated or screen jacket substituted in lieu thereof. By the employment of the latter the steam may be forced directly through the moving seed and screen-jacket in such a manner as to cleanse it and remove and carry away all impurities and excess of moisture previously contained therein.

In preparing seed for shipment or storage, I consider it preferable to use steam at a pressure of about sixty pounds, as its force, when issuing from the small holes in the reservoir, does the cleansing and removes all objectionable accumulated matter, and the high temperature accomplishes the drying. Thus the causes of fermentation are removed—a source of so much trouble and loss in packing and storing in bulk. For the operation of pressing, a lower temperature will suffice, as moisture is desirable to be added in such cases to soften the vegetable fibers of the seed and liquefy the oily parts thereof, so that the separation of the one from the other is more easily accomplished.

Having thus set forth my invention, I do not wish to be understood as claiming, broadly, the art of treating seed by steam; neither do I wish to be understood as claiming, broadly, all mechanism with which steam may be used for treating oleaginous seed, irrespective of the construction, arrangement, and operation of the same, as I am aware that steam has been employed heretofore for the purpose of treating seed.

I am also aware that mechanisms of different kinds and modes of operation have been used in connection with steam for a like purpose, one of which is a boiler provided with a steam-inlet at its top, a stirrer, and a cover for the whole. The seed to be treated being placed therein, the cover is closed and the steam or hot water admitted. It has been found in practice difficult to thoroughly and uniformly permeate a mass of seed so confined with the steam introduced at the top, and condensation with an excess of moisture has been the result, which is objectionable and desirable to avoid. Such apparatus I do not claim. Neither do I claim a steaming device (adapted to convey seed to grinding-stones) consisting of a tube and a revolving screw therein, which carries the seed over a perforated chamber formed upon its lower side. These also are old; but What I do claim, and desire to secure by Letters Patent of the United States, is—

1. The herein-described method of treating seed, consisting in allowing it to flow downward around a central perforated steam-reservoir, and forcing jets of steam from said reservoir outward through the mass of seed, the flow of said seed being regulated by stirrers, substantially as set forth.

2. The combination, with a seed-receptacle provided with a perforated steaming device, arranged within or below the material operated upon, of devices for stirring its contents at will, said devices operating upon a platform, substantially as and for the purposes set forth.

3. In combination with a seed-receptacle for holding the seed while being steamed, means for directing the steam into said seed, and horizontally-rotating stirrers adapted to regulate the flow of said seed, substantially as set forth.

4. An apparatus for treating oleaginous seed by steam, consisting of a receptacle adapted to receive and retain the seed at will, a steaming device adapted to be surrounded by said seed and eject steam in different directions outwardly from within the mass, and rotating stirrers, substantially as described, whereby said seed may be thoroughly permeated by said steam, substantially as and for the purposes set forth.

WILLIAM B. FISHER.

Witnesses:
JOHN DANE, Jr.,
WM. W. FORCE.